United States Patent Office 3,701,701
Patented Oct. 31, 1972

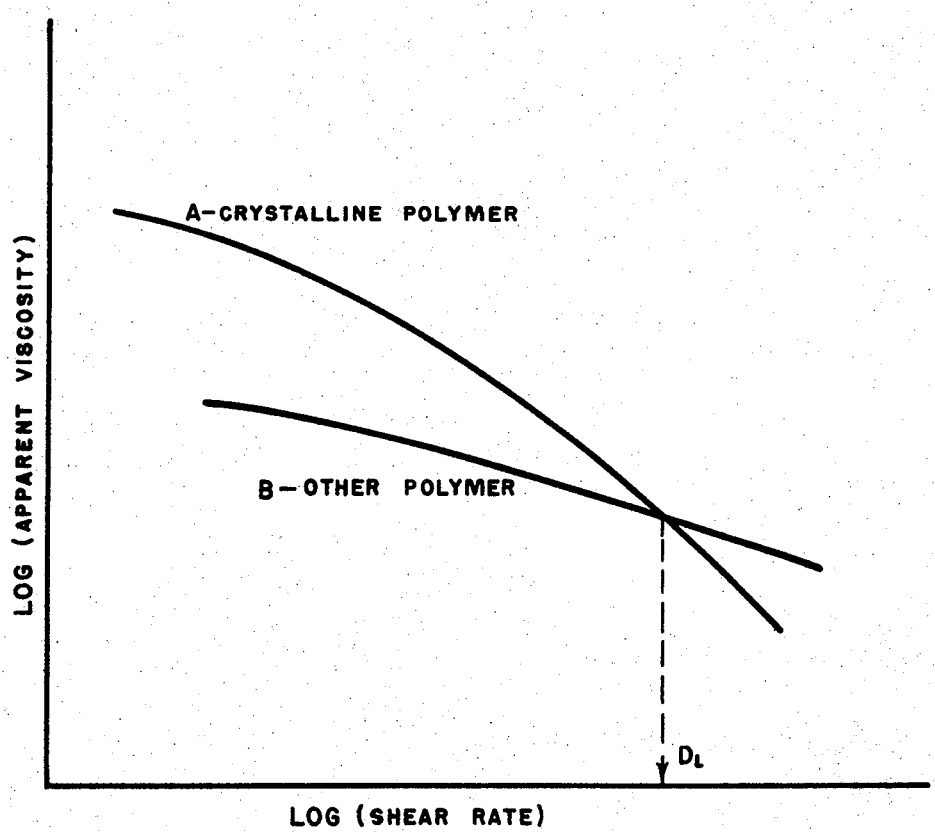

3,701,701
FIBROUS SHEET MATERIAL AND METHOD OF PRODUCING THE SAME
Hidenobu Sogi, Kurashiki, Japan, assignor to Kuraray Co., Ltd., Kurashiki, Japan
Filed Dec. 10, 1970, Ser. No. 96,820
Claims priority, application Japan, Dec. 19, 1969,
44/102,767, 44/102,768
Int. Cl. B32b 3/10
U.S. Cl. 156—229   16 Claims

ABSTRACT OF THE DISCLOSURE

The fibrous sheet material obtained by the method comprising:

(i) extruding a molten mixture of 30 to 70 volume percent of a crystalline polymer (1) and 70 to 30 volume percent of another polymer (2), which is incompatible with said crystalline polymer (1) and has a lower apparent melt viscosity than the crystalline polymer (1) under the extrusion conditions to make a film consisting of said mixture, in which the crystalline polymer (1) forms the discontinuous phase and the latter polymer (2) forms the continuous phase in said film, and having the crystalline orientation in the longitudinal axis of the film;

(ii) laminating more than two films in an orientation such that at least two of said films are in directions at an angle of 60 to 120° with respect to each other, and then (iii) biaxially stretching said laminate to 2 to 4 times in both lengthwise and crosswise directions simultaneously to produce a fibrous sheet material.

---

This invention relates to a fibrous sheet material produced from a film consisting of a mixture of a crystalline polymer and a polymer which is incompatible with the former, and particularly relates to a fibrous sheet material produced from a film obtained by extrusion of a mixture of the crystalline polymer and the other polymer, and further laminating, and simultaneously biaxially stretching said film. The fibrous sheet material as referred to herein is a sheet material formed by a group of fibers.

Conventional fibrous sheet materials comprise textiles and knit fabrics made of filaments or fibers, and unwoven cloths prepared by: (1) needle-punching of a fibrous mat consisting of fibers cut to a suitable length by random laying by the so-called "dry method" and (2) unwoven cloths by the so-called "wet method" in which cut fibers are dispersed in water or a similar liquid and formed into a sheet, a textile or a knit fabric, said cut fibers being formed by slitting a film and stretching the resultant fibers. Attempts also have been made to produce textiles and knit fabrics from a film prepared from a mixture of two types of polymers and is then slit and stretched into a fibrous condition.

The conventional fibrous sheet materials are, as described, formed from a fibrous material into a flat sheet material, whereas the present invention is intended to produce a fibrous sheet material directly from a film, and thereby essentially differs from conventional techniques.

A film obtained by extrusion of a mixture of two types of polymers which are mutually incompatible is generally oriented in a lengthwise direction, having high lengthwise strength, but very poor crosswise strength, and such a film cannot be biaxially stretched. Therefore, this type of film can hardly be used as a sheet material.

It is an object of this invention to overcome the differences of conventional fibrous sheet materials by providing a fibrous sheet material having both high lengthwise and crosswise strength whereby such film can be biaxially stretched. Other objects will be apparent from the ensuing description of this invention in conjunction with the drawing in which the figure is a graph showing the inter-relationship of apparent viscosity and shear rate of the polymers used in preparing the fibrous sheet material of this invention.

According to this invention, the fibrous sheet material is obtained by laminating a plurality of films, at least two of which are oriented at an angle of 60–120° with respect to each other, and further simultaneously and biaxially stretching the laminate, said films being produced by extrusion of a mixture of a crystalline polymer and another polymer which are mutually incompatible. Only by the method of laminating a film obtained by extrusion of a mixture of two types of polymers oriented in a certain direction with respect to each other, can the film be biaxially stretched to give a product having high strength, both in the lengthwise and crosswise directions.

The fibrous sheet material of this invention comprises the following four types:

(1) one obtained by (a) laminating at least two films, at least two of which are at a 60–120° angle with respect to each other, said films being produced by extrusion of a mixture of an incompatible crystalline polymer and another polymer, and (b) by further simultaneously biaxially stretching said laminate;

(2) one obtained by further heat-treating said sheet material (1);

(3) one obtained by extracting the polymer consisting of the continuous part of the said sheet material (1) with a solvent for said polymer; and (4) one obtained by heat-treating said sheet material (1) and further extracting the polymer comprising the continuous part of the heat-treated sheet material with a solvent for said polymer.

The crystalline polymers which can be used in this invention comprise polymers having a high degree of crystallinity, used in melt forming such as polyethylene, polypropylene, polyamides and polyethylene terephthalate, and the like.

The polymers used in this invention, in admixture with the crystalline polymers comprise polymers which can be used in melt forming, such as ethylene copolymers, polystyrene, styrene copolymers, acrylate resins, polyamides, cellulose acetate and the like. These polymers are required to be incompatible with crystalline polymers. It is important that the relationship between the melt viscosities of the crystalline polymer and the polymer to be mixed therewith be proper, as shown in the figure.

The figure is a graph showing the relation between the apparent viscosity and the shear rate of a melt of a crystalline polymer forming the discontinuous phase and a polymer forming the continuous phase in a mixture of two types of polymers. Curve A shows the relation between the apparent viscosity and the shear rate of the crystalline polymer forming the discontinuous phase, and curve B shows the relation between the apparent viscosity and the shear rate of the polymer forming the continuous phase. The value DL indicates the shear rate at the time the apparent viscosities of the crystalline polymer and the other polymer are equal. In the production by extrusion of the film from the mixture of the two types of polymers, with reference to the conditions of temperature and shear rate of the extrusion, it is essential that the apparent viscosity of the crystalline polymer is higher than that of the other polymer mixed therewith. The apparent viscosity and the shear rate of each polymer as referred to herein are determined by applying a difference of pressure P to both ends of a capillary tube with a radius (R) of 0.05 cm. and a length (L) of 1 cm., and measuring the flow rate Q of the polymer, and then solving the following formula:

$$\text{Apparent viscosity} = \frac{\pi P R^4}{8LQ} \quad (i)$$

$$\text{Shear rate} = \frac{4Q}{\pi R^3} \quad (ii)$$

The relation between the apparent viscosity and the shear rate given by the above method is shown in the figure wherein, curve A shows the crystalline polymer, while curve B shows the other polymer. That the apparent viscosity of the crystalline polymer is higher than that of the polymer mixed therewith under conditions of extrusion means that the molding proceeds in a manner such that the shear rate at the molding temperature becomes lower than DL. By satisfying this condition, the crystalline polymer forms the discontinuous phase in the mixture, and the polymer mixed therewith forms the continuous phase and accordingly the crystalline polymer turns into a fibrous form, the lamination proceeds easily as will be explained hereinafter, and effective extraction is carried out thereby giving an extracted substance which will have gas-permeability. When the difference in melt viscosity between the crystalline polymer and the polymer mixed therewith is too great, it is extremely difficult to mix both homogeneously. It is, therefore, desirable that the apparent viscosity of the crystalline polymer under the extrusion condition satisfy the following formula:

$$\frac{\text{Apparent viscosity of crystalline polymer}}{\text{Apparent viscosity of the polymer mixed}} < 10$$

When the above conditions are satisfied, mixing can be carried out relatively homogeneously.

The proportion of polymers in the mixture is desirably about 30–70 vol. percent of crystalline polymer (forming the discontinuous phase in the mixture) and 70–30 vol. percent of the other polymer. If the crystalline polymer content is less than about 30 vol. percent, fibrous flat material having a high strength cannot be produced while if it is more than about 70 vol. percent, the crystalline polymer occasionally fails to form a discontinuous phase and the extraction of the other mixed polymer cannot be efficiently effected as will be explained later.

For homogeneous mixing of the crystalline polymer and the other polymer, it is necessary to select the best method of mixing, based upon the polymers which are used, the mixing proportion, the melt viscosities of both polymers and so on. For homogeneous mixing various methods can be used, such as mixing the polymers in pellet or powder form, mixing the polymers on rolls, mixing the polymers in a Banbury mixer, mixing the polymers in molten condition in an extruder, etc. In the case of a combination of polymers, the homogeneous mixing of which is extremely difficult, the polymers can be easily and homogeneously mixed at as low a temperature as possible, but above the melting point of the crystalline polymer.

Extrusion conditions for producing the film by extruding the mixture of the two types of polymers mixed by the above-mentioned methods should be determined by the combination of the two types of polymers to be used, but it is generally possible to extrusion mold by selecting extrusion conditions which are close to those for the extrusion of the crystalline polymer. However, it is necessary that the temperature conditions at the back of the cylinder of the extruding machine is suitable for the type of polymer which forms the continuous phase.

In the present invention, it is also important to properly laminate the oriented film of the mixture of the crystalline polymer and the other polymer. The temperature for lamination should be higher than initial flow temperature of the polymer forming the continuous phase, but lower than the melting point of the crystalline polymer forming the discontinuous phase. When laminating several sheets of film, it is necessary that at least two sheets of film are oriented at an angle of 60–120° to each other. At any other angles, the film will be split in the biaxial stretching, or the directionality of the product obtained by the biaxial stretching will be increased, resulting in an extremely low strength in one direction. Lamination in the direction of orientation having angles as referred to above, includes the case wherein a rotary die is used and the direction of orientation continuously changes. The film laminated in continuously changing directions of orientation has the same effect as several sheets of film laminated in different orientation directions, hence it is included in this invention.

It is important to biaxially stretch the laminate of the film of the mixture of the two types of polymers to increase the strength thereof. Simultaneous biaxial stretching is preferrable. Non-simultaneous biaxial stretching is not desirable as it causes breaking of the film. The elongation temperature is determined according to the combination of the crystalline polymer and the other polymer. For example, when polypropylene is used as the crystalline polymer, desirable temperature is about 100–150° C., when polyamides are used, a desirable temperature is about 60–180° C., and when polyethylene terephthalate is used, a desirable temperature is about 80–180° C. By suitably combining the crystalline polymer and the other polymer and selecting suitable elongation temperatures, it is possible to apply cracks uniformly to the elongated film. The multiple of elongation by biaxial stretching is desirably about 2–4 times in both the lengthwise and crosswise directions, but maximum useful elongation depends on the combination of the two types of polymers, the proportion of the polymers and the mixing conditions.

Heat-treatment optionally employed in the production of the fibrous sheet material of this invention, can serve to decrease cracks formed by elongation, and improve dimensional stability thereof. When the polymer forming the continuous phase is extracted, film which is not heat-treated will strip off at the laminated interface, but heat-treated film will never strip off, and the surface after the extraction is extremely smooth. While the heat-treating conditions depend on the combination of the two types of polymers, the heat-treatment temperature is desirably higher than the elongation temperature and lower than the melting point of the crystalline polymer used. The heat-treatment temperature when polypropylene is used as the crystalline polymer is desirably about 140–160° C., about 160–190° C. for polyamides and about 160–200° C. for polyesters. The film obtained after heat-treatment generally has higher ductility.

Extraction as is optionally used in the production of the fibrous sheet material of this invention refers to extraction of the polymer forming the continuous phase of the film of the mixture. The solvent used in said extraction should dissolve the other polymer, but should not dissolve the crystalline polymer forming the discontinuous phase. It is desirable to extract 50–99 vol. percent of the other polymer. If extraction is of less than about 50 vol. percent, the hand remains essentially the same as fiber which has not been extracted, and if more than 99 vol. percent is extracted, stripping at the laminated interface may occur or the form of the remaining fiber may collapse. On the surface of film which has been extracted as above, the pattern of fibrous material will appear, giving it an appearance similar to Japanese "washi" paper.

The fibrous sheet material of this invention is preferably obtained by extrusion molding a mixture of polypropylene and the saponified product of ethylene/vinyl acetate copolymer, and laminating sheets of the resultant film in an orientation angle of 60–120°, and further simultaneously and biaxially stretching the laminate. Only by laminating the film prepared from a mixture obtained by extrusion molding in said orientation direction, can the film be biaxially stretched, with improved lengthwise and crosswise strength, and will the strength of the oriented polypropylene be fully utilized by the elongation.

The preferred fibrous sheet material of this invention comprises four types:

(1) One obtained by laminating the film prepared by extrusion molding of a mixture of polypropylene and the saponified product of ethylene/vinyl acetate copolymer which are mutually incompatible, oriented at a certain angle with respect to each other, and further simultaneously and biaxially stretching said laminate;

(2) One obtained by heat-treating stretched film (1);

(3) The stretched film (1) from which the saponified product of ethylene/vinyl acetate copolymer is extracted with a solvent therefore; and (4) The heat-treated film (2) from which the saponified product of ethylene/vinyl acetate copolymer forming the continuous phase is extracted with the solvent therefor.

The stretched film (1) has a hand resembling that of Japanese "washi" paper; the heat-treated film (2) has a hand like that of paraffin paper; and the extracted films (3) and (4) have a hand like that of paper or unwoven cloth. These fibrous sheet materials can be obtained when the following requirements are satisfied.

The polypropylene used in this invention is an isotactic polypropylene or a copolymer in which ethylene and/or a like monomer which is copolymerizable with propylene, is copolymerized therewith. The degree of polymerization of polypropylene should be determined in respect to the saponified product of the ethylene/vinyl acetate copolymer, by ASTM D-1238-52T, and should be in the range of 0.2-10 g./10 min. of melt index measured at temperature 230° C., and a load of 2160 g.

The saponified product of ethylene/vinylacetate copolymer used in this invention is an ethylene/vinylacetate copolymer whose vinyl acetate groups are replaced by vinyl alcohol groups, said copolymer consisting of 30–45 mol percent ethylene and 70–55 mol percent vinylacetate, and the percentage $y$ of conversion of vinylacetate groups into vinyl alcohol groups should satisfy the following formula wherein $x$ is the mole percent ethylene content of the ethylene/vinylacetate copolymer:

$$0.533x + 54.0 \leq y \leq 0.667x + 63.0$$

When a saponified product of the ethylene/vinylacetate copolymer which satisfies the above formula is used, the resultant film does not stick to the clips of the biaxial stretching apparatus and does not break in the biaxial stretching step, i.e., the cracks are evenly distributed in said film. When said saponified product of ethylene/vinyl-acetate copolymer and polypropylene is used, the relation between the melt viscosities of the polymers at the time of extrusion molding of the film of the mixture is important. When preparing a film of the mixture of polypropylene and the saponified product of ethylene/vinyl-acetate copolymer by extrusion molding under the conditions of extrusion temperature and the shear rate, it is essential that the apparent viscosity of polypropylene is higher than that of the saponified product of ethylene vinylacetate copolymer. The apparent viscosities and the shear rates of both polymers are determined by measuring the flow rate Q of the polymer, applying a difference of pressure P to both ends of a capillary tube having a radius R of 0.05 cm. and a length L of 1 cm., and solving Formulae i and ii described above.

The relation between the apparent viscosity and the shear rate described above is shown in the figure. Curves A and B show this relation for polypropylene and the saponified product of ethylene/vinylacetate copolymer. That the apparent viscosity of polypropylene is higher than that of the saponified product of ethylene/vinylacetate copolymer under extrusion molding conditions, signifies that extrusion molding is carried out under conditions such that the shear rate at the molding temperature is smaller than DL. When the above conditions are satisfied, polypropylene is caused to form the discontinuous phase in the mixture and the saponified product of ethylene/ vinylacetate copolymer forms the continuous phase. As a result, polypropylene takes the form of fibers and can be easily laminated as will be explained hereinafter, and the extrusion efficiency of the saponified product of ethylene/vinylacetate copolymer is increased, and further the extracted product will have gas-permeability. When the difference in the viscosities of polypropylene and the saponified product of ethylene/vinylacetate copolymer is great, it is extremely difficult to mix the two homogeneously, but when the apparent viscosity of polypropylene satisfies the following formula under the extrusion molding conditions, the two can be mixed homogeneously relatively easily.

$$\frac{\text{Apparent viscosity of polypropylene}}{\text{Apparent viscosity of saponified product of ethylene/vinylacetate copolymer}} < 10$$

30–70 vol. percent polypropylene to 70–30 vol. percent saponified product of ethylene/vinylacetate copolymer is a desirable mixing proportion for these two polymers. When the polypropylene content is less than 30 vol. percent a strong fibrous flat material cannot be obtained, while when more than 70 vol. percent is used, polypropylene may occasionally fail to form a discontinuous phase in the mixture, and furthermore the efficiency in extraction of the saponified product of ethylene/vinylacetate copolymer will be reduced.

For homogeneous mixing of polypropylene and the saponified product of ethylene/vinylacetate copolymer, the polymers, the mixing proportion, the melt viscosity, etc. should be considered in choosing the specific mixing technique. Useful mixing methods comprise mixing the polymers in pellet form or powder form or mixing the polymers in molten condition on mixing rolls, Banbury mixers, extruding machines, etc. In the case of a combination of polymers which cannot be easily mixed homogeneously, homogeneity will be improved by mixing the polymers at as low a temperature as possible, but higher than the melting point of polypropylene.

When the film made by extrusion molding of the mixture of polypropylene and the saponified product of ethylene/vinylacetate copolymer by the above method is used, the processing conditions should be determined according to the combination of the two polymers, and it is possible to extrusion mold the mixture by selecting conditions akin to the extrusion molding conditions for polypropylene, and the temperature at the back of the cylinder of the extruding machine should be determined according to the type of the saponified product of ethylene/vinylacetate copolymer.

As noted above, it is also important to correctly laminate the film of the mixture of polypropylene and the saponified product of ethylene/vinylacetate copolymer. The laminating temperature is required to be higher than the initial flow temperature of the saponified product of ethylene/vinylacetate copolymer, but lower than the melting point of polypropylene. In laminating, a plurality of sheets of film, at least two sheets should be oriented in directions at an angle of 60–120° with respect to each other. Only by satisfying the abovementioned conditions will biaxial stretching which constitutes one of the most important factors of the invention become possible. When these conditions are not satisfied, the film may break during biaxial stretching, and the product obtained by the biaxial stretching will have directionality, i.e., a direction in which it is extremely weak. The lamination in certain orientation also includes the case wherein the orientation direction continuously changes as when, for example, a rotary die is used. While said film is not laminated, when its surface is cut at a right angle to the direction of thickness, the two sheets of film have different orientation directions with respect to each other, and thus such a film exhibits the same effects as the laminate of several sheets of the film having different orientation directions, and is included in this invention.

The biaxial stretching of the laminated film of the mixture of polypropylene and the saponified product of ethylene/vinylacetate copolymer as abovementioned is important for increasing the strength of the film. Particularly, simultaneous biaxial stretching is desirable, and non-simultaneous biaxial stretching is not desirable, as the film then may be split. An elongation temperature of 120–150° C. is desirable. By selecting suitable elongation temperatures, cracks will be distributed evenly in the elongated film. Simultaneous biaxial stretching giving an elongation of 2–4 times in both lengthwise and crosswise directions is desirable, but the multiple of maximum possible elongation depends on the combination of the polymers, mixing proportion and mixing conditions.

In production of the fibrous flat material of this invention from a mixtue of polypropylene and the saponified product of ethylene/vinylacetate copolymer, heat-treatment is optionally applied to reduce the number of size of the cracks produced by the elongation and the cracks will be distributed evenly and the dimensional stability will be improved. When the saponified product of ethylene/vinylacetate copolymer forming the continuous phase in the film of the mixture, is extracted with a solvent therefore, the laminate which was not heat-treated may strip off at the laminated interface while one which has been heat-treated will never strip off, and the surface of the film after the extraction is extremely smooth. By heat-treatment, the strength of the film is somewhat increased, and the ductility is markedly improved.

The extraction which is optionally employed in the production of the fibrous sheet material of this invention means the extraction of the saponified product of ethylene/vinylacetate copolymer forming the continuous phase in the film with a solvent therefor. As solvents for the saponified product of ethylene/vinylacetate copolymer, a mixture of methanol and water, dimethylformamide, dimethylsulfoxide, epichlorohydrin, etc. can be used. The rate of extraction should be 50–99 vol. percent of the saponified product of ethylene/vinylacetate copolymer. If the rate of extraction is less than 50 vol. percent, the hand of the film remains the same as after biaxially stretched, and if it is more than 99 vol. percent, stripping at the laminated interface may occur or the form of the extracted product may collapse. The product thus extracted will show a fibrous pattern on its surface, such as that of paper or unwoven cloth.

The following examples are given to further illustrate, without limiting this invention.

EXAMPLES 1–12

Polypropylene (crystalline polymer) and the other polymer in the form of pellets were mixed in a proportion of 50:50 vol. percent, and extruded at 235° C. and at shear rate of 200 sec.$^{-1}$ into a film having a thickness of 0.2 mm. Two sheets of the film were laminated at a temperature 10–15° C. higher than the initial flow temperature of the polymer forming the continuous phase, and were further subjected to simultaneous biaxial stretching at 130° C., and then heat-treated at 150° C. The performances of the film thus obtained and of the film from which the polymer forming the continuous phase was extracted with a solvent therefor, are shown in Table 1.

TABLE 1

| Ex. No. | (1) Crystalline polymer (discontinuous phase in the film) | (2) Other polymer mixed (continuous phase in the film) | Apparent viscosity (poise) Polymer (1) | Apparent viscosity (poise) Polymer (2) | Multiple of elongation | Heat-treatment | Unextracted product Strength (kg./cm.²) | Unextracted product Elongation (percent) | Extracted product Rate of extraction (vol. percent) | Extracted product Strength (kg./cm.²) | Extracted product Elongation (percent) |
|---|---|---|---|---|---|---|---|---|---|---|---|
| 1 | Polypropylene | Ethylene-vinylacetate copolymer.[a] | 6.50×10³ | 3.35×10³ | 3×3 | No | 177 | 49 | c 96 | 92 | 27 |
| 2 | do | do | 6.50×10³ | 3.35×10³ | 3×3 | Yes | 180 | 55 | 96 | 93 | 55 |
| 3 | do | Polystyrene | 6.50×10³ | 2.47×10³ | 3×3 | No | 382 | 32 | d 98 | 190 | 17 |
| 4 | do | do | 6.50×10³ | 2.47×10³ | 3×3 | Yes | 395 | 38 | 98 | 192 | 40 |
| 5 | do | do | 6.50×10³ | 2.47×10³ | 2.5×2.5 | No | 334 | 14 | | | |
| 6 | do | do | 6.50×10³ | 2.47×10³ | 2.5×2.5 | Yes | 350 | 15 | | | |
| 7 | do | do | 6.50×10³ | 2.47×10³ | 2×2 | No | 182 | 6 | | | |
| 8 | do | do | 6.50×10³ | 2.47×10³ | 2×2 | Yes | 189 | 7 | | | |
| 9 | do | Styrene/acrylonitrile copolymer.[b] | 6.50×10³ | 5.70×10³ | 3×3 | No | 322 | 34 | e 99 | 160 | 11 |
| 10 | do | do | 6.50×10³ | 5.70×10³ | 3×3 | Yes | 330 | 45 | 99 | 161 | 30 |
| 11 | do | Methyl methacrylate | 6.50×10³ | 5.50×10³ | 3×3 | No | 554 | 27 | 98 | 283 | 14 |
| 12 | do | do | 6.50×10³ | 5.50×10³ | 3×3 | Yes | 565 | 35 | 98 | 285 | 35 |

[a] Content of ethylene: 86 mol percent.
[b] Content of styrene: 70 weight percent.
[c] Solvent: toluene.
[d] Solvent: toluene.
[e] Solvent: ethylacetate.

EXAMPLES 13–28

Nylon 6 (polycaprolactam) as the crystalline polymer and the other polymer used in Examples 1 to 12 were mixed in a proportion of 50:50 vol. percent and extrusion molded at 235° C. and at a shear rate of 200 sec.$^{-1}$ into a film having the thickness of 0.2 mm. Films were then laminated in an orientation at right angles with respect to each other at a temperature 10–15° C. higher than the initial flow temperature of the polymer forming the continuous phase, and further simultaneously and biaxially stretched at 120° C. Then the laminate was heat-treated at 180° C. The performances of the resultant film and the film from which the polymer forming the continuous phase was extracted, are shown in Table 2.

TABLE 2

| Ex. No. | (1) Crystalline polymer (discontinuous phase in the film) | (2) Other polymer mixed (continuous phase in the film) | Apparent viscosity (poise) Polymer (1) | Apparent viscosity (poise) Polymer (2) | Multiple of elongation | Heat-treatment | Unextracted product Strength (kg./cm.²) | Unextracted product Elongation (percent) | Extracted product Rate of extraction (vol. percent) | Extracted product Strength (kg./cm.²) | Extracted product Elongation (percent) |
|---|---|---|---|---|---|---|---|---|---|---|---|
| 13 | Nylon 6 | Ethylene-vinyl acetate copolymer | 1.80×10⁴ | 3.35×10³ | 2×2 | No | 402 | 87 | 75 | 268 | 167 |
| 14 | do | do | 1.80×10⁴ | 3.35×10³ | 2×2 | Yes | 405 | 90 | 75 | 270 | 180 |
| 15 | do | Polystyrene | 1.80×10⁴ | 2.47×10³ | 2×2 | No | 385 | 79 | 91 | 202 | 41 |
| 16 | do | do | 1.80×10⁴ | 2.47×10³ | 2×2 | Yes | 390 | 86 | 91 | 205 | 70 |
| 17 | do | Styrene/acrilonitrile copolymer | 1.80×10⁴ | 5.70×10³ | 2×2 | No | 235 | 105 | 89 | 131 | 56 |
| 18 | do | do | 1.80×10⁴ | 5.70×10³ | 2×2 | Yes | 237 | 120 | 89 | 132 | 75 |
| 19 | do | Methylmethacrylate | 1.80×10⁴ | 5.50×10³ | 2×2 | No | 482 | 122 | 90 | 268 | 149 |
| 20 | do | do | 1.80×10⁴ | 5.50×10³ | 2×2 | Yes | 485 | 143 | 90 | 270 | 160 |

EXAMPLES 21-24

Polyethylene terephthalate as the crystalline polymer and the other polymer used in Examples 1-12, in pellet form were mixed in a proportion of 50:50 vol. percent, and extrusion molded at 270° C. at the shear rate of 200 sec.$^{-1}$ into a film 0.2 mm. thick and two sheets of the film were laminated at a temperature 10-15° C. higher than the initial flow temperature of the polymer forming the continuous phase in orientation directions whereby they intersected at right angles, then simultaneously and biaxially stretched at 130° C., and further heat treated at 190° C. The performances of the resultant films and the films from which the polymer forming, the continuous phase were extracted with the solvent therefor, are shown in Table 3.

EXAMPLES 25-28

Polypropylene and ethylene vinylacetate copolymer used in Examples 1 and 2, but having different proportions were mixed and processed by the method of Examples 1-12, and the performances of the resultant products are shown in Table 4.

Also, polyethylene terephthalate and polystyrene used in Examples 23-24, but having different proportions were mixed and processed by the method of Examples 1-12 and the performances of the resultant products are shown in Table 4.

EXAMPLES 29-52

50 vol. percent of polypropylene (melt index: 0.4) and 50 vol. percent of the saponified product of ethylene/vinylacetate copolymer containing 32.9 mol percent ethylene (72.8 percent saponification), both in pellet form, were mixed and made into pellets of the mixture, using a rapid compression type screw at 220° C. From the pellets was produced a 0.2 mm. thick film at a temperature of 220° C. and a shear rate of 200 sec.$^{-1}$. The apparent viscosity of polypropylene under said extrusion conditions was $7.40 \times 10^3$ poise and that of the saponified product of ethylene/vinylacetate copolymer was $7.00 \times 10^3$ poise. Several sheets of the resultant film of the mixture were heat-laminated at 155-160° C. in right angle orientation and simultaneously biaxially stretched. The heat-treatment was completed in a minute at 150° C. In the extraction, a mixture of 80 wt. percent methanol and 20 wt. percent water was used at 50° C. The performances of the respective products are shown in Table 5.

TABLE 5

| Ex. No. | Treatment | Number of sheets laminated | Elongation multiple | Heat-treatment | Extraction (percent) | Thickness (mm.) | Weight (g./m.²) | Modulus of elasticity (kg./cm.²) | Strength (kg./cm.²) | Elongation (percent) |
|---|---|---|---|---|---|---|---|---|---|---|
| 29 | Elongated | 4 | 3×3 | No | | 0.185 | 88.9 | 1,060 | 120 | 16.0 |
| 30 | | 6 | 3×3 | No | | 0.231 | 133.8 | 1,370 | 185 | 23.7 |
| 31 | | 8 | 3×3 | No | | 0.299 | 173.2 | 1,270 | 196 | 35.3 |
| 32 | | 4 | 4×4 | No | | 0.120 | 52.5 | 1,200 | 148 | 14.8 |
| 33 | | 6 | 4×4 | No | | 0.140 | 71.8 | 1,300 | 199 | 22.0 |
| 34 | | 8 | 4×4 | No | | 0.166 | 97.8 | 1,540 | 207 | 22.2 |
| 35 | Heat-treated and elongated | 4 | 3×3 | Yes | | 0.113 | 74.2 | 1,190 | 109 | 44.4 |
| 36 | | 6 | 3×3 | Yes | | 0.152 | 122.7 | 1,440 | 139 | 71.4 |
| 37 | | 8 | 3×3 | Yes | | 0.395 | 167.4 | 1,790 | 196 | 58.6 |
| 38 | | 4 | 4×4 | Yes | | 0.190 | 51.5 | 472 | 51.6 | 34.9 |
| 39 | | 6 | 4×4 | Yes | | 0.118 | 75.6 | 1,570 | 159 | 37.1 |
| 40 | | 8 | 4×4 | Yes | | 0.155 | 100.4 | 1,750 | 222 | 54.1 |
| 41 | Elongated, and extracted | 4 | 3×3 | No | 95.1 | 0.157 | 46.3 | 737 | 50.5 | 7.1 |
| 42 | | 6 | 3×3 | No | 96.4 | 0.180 | 61.8 | 997 | 70.2 | 7.1 |
| 43 | | 8 | 3×3 | No | 86.2 | 0.244 | 89.0 | 1,210 | 127 | 13.5 |
| 44 | | 4 | 4×4 | No | 91.4 | 0.100 | 26.0 | 879 | 87.4 | 10.1 |
| 45 | | 6 | 4×4 | No | 90.5 | 0.113 | 36.0 | 1,320 | 115 | 9.2 |
| 46 | | 8 | 4×4 | No | 98.4 | 0.134 | 43.4 | 1,320 | 109 | 8.7 |
| 47 | Elongated, Heat-treated and extracted | 4 | 3×3 | Yes | 98.6 | 0.108 | 39.7 | 848 | 61.8 | 13.4 |
| 48 | | 6 | 3×3 | Yes | 99.0 | 0.151 | 61.9 | 767 | 56.0 | 10.5 |
| 49 | | 8 | 3×3 | Yes | 92.2 | 0.240 | 84.1 | 1,150 | 125 | 17.9 |
| 50 | | 4 | 4×4 | Yes | 99.0 | 0.072 | 23.6 | 705 | 65.7 | 15.5 |
| 51 | | 6 | 4×4 | Yes | 91.7 | 0.092 | 37.5 | 1,320 | 130 | 17.4 |
| 52 | | 8 | 4×4 | Yes | 89.9 | 0.133 | 57.4 | 1,180 | 129 | 18.0 |

EXAMPLES 53-56

40 vol. percent of polypropylene and 60 vol. percent of the saponified product of ethylene/vinylacetate copolymer, in pellet form as used in Example 1 were mixed and the pellets of the mixture were prepared under the same conditions as of Example 1 from which was pro-

TABLE 3

| Ex. No. | (1) Crystalline polymer (discontinuous phase in the film) | (2) Other polymer mixed (continuous phase in the film) | Apparent viscosity (poise) Polymer (1) | Apparent viscosity (poise) Polymer (2) | Multiple of elongation | Heat-treatment | Unextracted product Strength (kg./cm.²) | Unextracted product Elongation (percent) | Extracted product Rate of extraction (vol. percent) | Extracted product Strength (kg./cm.²) | Extracted product Elongation (percent) |
|---|---|---|---|---|---|---|---|---|---|---|---|
| 21 | Polyethylene terephthalate | Ethylene/ethyl acrylate copolymer.[a] | 1.04×10⁴ | 1.60×10³ | 2×2 | No | 637 | 16 | [b] 87 | 367 | 71 |
| 22 | do | do | 1.04×10⁴ | 1.60×10³ | 2×2 | Yes | 637 | 53 | 87 | 371 | 80 |
| 23 | do | Polystyrene | 1.04×10⁴ | 1.60×10³ | 2.5×2.5 | No | 548 | 73 | [c] 77 | 356 | 108 |
| 24 | do | do | 1.04×10⁴ | 1.60×10³ | 2.5×2.5 | Yes | 546 | 80 | 77 | 355 | 112 |

[a] Content of ethylene: 92 mol percent.
[b] Solvent: benzene.
[c] Solvent: toluene.

TABLE 4

| Ex. No. | (1) Crystalline polymer (discontinuous phase in the film) | (2) Other polymer mixed (continuous phase in the film) | Apparent viscosity (poise) Polymer (1) | Apparent viscosity (poise) Polymer (2) | Multiple of elongation | Heat-treatment | Unextracted product Strength (kg./cm.²) | Unextracted product Elongation (percent) | Extracted product Rate of extraction (vol. percent) | Extracted product Strength (kg./cm.²) | Extracted product Elongation (percent) |
|---|---|---|---|---|---|---|---|---|---|---|---|
| 25 | Polypropylene | Ethylene-vinylacetate copolymer.[a] | [d] 60 | [d] 40 | 3×3 | Yes | 255 | 35 | [b] 94 | 163 | 80 |
| 26 | do | do | [d] 40 | [d] 60 | 3×3 | Yes | 102 | 80 | 98 | 80 | 33 |
| 27 | Polyethylene tetephthalate | Polystyrene | [d] 60 | [d] 40 | 2.5×2.5 | Yes | 730 | 55 | [c] 70 | 435 | 128 |
| 28 | do | do | [d] 40 | [d] 60 | 2.5×2.5 | Yes | 363 | 30 | 83 | 303 | 58 |

[a] Content of ethylene: 86 mol percent.
[b] Solvent: toulene.
[c] Solvent: toulene.
[d] Volume percent.

duced the laminated and biaxially stretched films showing the performances as given in Table 6.

EXAMPLES 57–64

50 vol. percent of polypropylene (melt index: 0.4) and 50 vol. percent of the saponified product (80.9% saponification) of ethylene/vinylacetate copolymer containing 39.4 mol percent ethylene, both in pellet form were mixed and pellets of the mixture were produced by a rapid transition metering-type screw at 220° C. The pellets were then formed into a film, 0.2 mm. thick, at a temperature of 220° C. and a shear rate of 200 sec.$^{-1}$. The apparent viscosity of polypropylene was $7.40 \times 10^3$ poise and that of the saponified product of ethylene/vinylacetate copolymer was $40 \times 10^{-3}$ poise under the extrusion conditions. Six sheets of the film of the mixture were heat-laminated at 150–155° C. in such orientation that the directions of the films intersected at right angles with respect to each other, then simultaneously and biaxially stretched at 130° C., heat-treated at 150° C. for one minute, and further extracted using a mixture of 80 wt. percent methanol and 20 wt. percent water at 50° C. The properties of the respective products are shown in Table 7.

TABLE 6

| Example No. | Number of sheets | Elongation multiple | Heat-treatment | Thickness (mm.) | Weight (g./m.²) | Modulus of elasticity (kg./cm.²) | Strength (kg./cm.²) | Elongation (percent) |
|---|---|---|---|---|---|---|---|---|
| 53 | 4 | 3×3 | No | 0.189 | 83.8 | 643 | 41.9 | 41.0 |
| 54 | 6 | 3×3 | No | 0.255 | 140.1 | 967 | 70.1 | 70.0 |
| 55 | 4 | 4×4 | No | 0.126 | 50.6 | 836 | 25.3 | 25.3 |
| 56 | 6 | 4×4 | No | 0.162 | 80.8 | 1,032 | 40.1 | 40.4 |

TABLE 7

| Ex. No. | Treatment | Elongation multiple | Heat-treatment | Extraction (percent) | Thickness (mm.) | Weight (g./m.²) | Modulus of elasticity (kg./cm.²) | Strength (kg./cm.²) | Elongation (percent) |
|---|---|---|---|---|---|---|---|---|---|
| 57 | Elongated | 3×3 | No |  | 0.233 | 147.1 | 1,680 | 148 | 16.0 |
| 58 | Elongated | 4×4 | No |  | 0.138 | 73.0 | 1,890 | 160 | 10.2 |
| 59 | Elongated and heat treated | 3×3 | Yes |  | 0.188 | 126.4 | 1,790 | 122 | 30.1 |
| 60 | Elongated and heat treated | 4×4 | Yes |  | 0.122 | 76.5 | 1,700 | 156 | 22.4 |
| 61 | Elongated and extracted | 3×3 | No | 80.2 | 0.222 | 95.3 | 1,290 | 98.0 | 11.0 |
| 62 | Elongated and extracted | 4×4 | No | 87.2 | 0.115 | 38.2 | 1,430 | 112 | 8.6 |
| 63 | Elongated, heat treated and extracted | 3×3 | Yes | 91.0 | 0.142 | 59.0 | 1,150 | 57.3 | 12.4 |
| 64 | Elongated, heat treated and extracted | 4×4 | Yes | 91.5 | 0.092 | 37.2 | 1,390 | 93.0 | 17.5 |

EXAMPLES 65–72

50 vol. percent of polypropylene (melt index: 0.4) and 50 vol. percent of the saponified product (84.6% saponification) of ethylene/vinylacetate copolymer containing 39.4 mol percent ethylene, in pellet form were mixed and made into a film, laminated, stretched, heat-treated and extracted under the conditions described in Examples 29–36, and the performances of the respective products are given in Table 8. Under the extrusion conditions, the apparent viscosity of polypropylene was $7.40 \times 10^3$ poise while that of the saponified product of ethylene/vinylacetate copolymer was $2.90 \times 10^3$ poise.

TABLE 8

| Ex. No. | Treatment | Elongation multiple | Heat-treatment | Extraction (percent) | Thickness (mm.) | Weight (g./m.²) | Modulus of elasticity (kg./cm.²) | Strength (kg./cm.²) | Elongation (percent) |
|---|---|---|---|---|---|---|---|---|---|
| 65 | Elongated | 3×3 | No |  | 0.263 | 155.7 | 1,200 | 133 | 18.8 |
| 66 | Elongated | 4×4 | No |  | 0.167 | 78.2 | 1,310 | 146 | 13.2 |
| 67 | Elongated and heat treated | 3×3 | Yes |  | 0.186 | 111.6 | 1,750 | 122 | 35.6 |
| 68 | Elongated and heat treated | 4×4 | Yes |  | 0.121 | 67.9 | 1,820 | 146 | 23.0 |
| 69 | Elongated and extracted | 3×3 | No | 93.8 | 0.249 | 88.9 | 494 | 37.4 | 8.1 |
| 70 | Elongated and extracted | 4×4 | No | 95.5 | 0.141 | 40.7 | 553 | 30.0 | 6.0 |
| 71 | Elongated, heat treated and extracted | 3×3 | Yes | 94.8 | 0.147 | 60.6 | 811 | 67.1 | 12.5 |
| 72 | Elongated, heat treated and extracted | 4×4 | Yes | 93.8 | 0.109 | 41.9 | 874 | 75.3 | 5.7 |

What is claimed:

1. A method of producing a fibrous sheet material which comprises:
   (i) extruding a molten mixture of 30 to 70 volume percent of a crystalline polymer (1) and 70 to 30 volume percent of another polymer (2), which is incompatible with said crystalline polymer and has a lower apparent melt viscosity than the crystalline polymer under extrusion conditions, to make a film consisting of said mixture, in which the former polymer (1) forms the discontinuous phase and the latter polymer (2) forms the continuous phase in said film, and having its orientation in the lengthwise direction of the film;
   (ii) laminating a plurality of sheets of said films in such an orientation that at least two sheets of said films are oriented at an angle of 60 to 120° with respect to each other; and then
   (iii) biaxially stretching said laminate 2 to 4 times in lengthwise and crosswise directions simultaneously at a predetermined temperature to produce a fibrous sheet material consisting of said mixture and having both a discontinuous and continuous phase.

2. The method of producing a fibrous sheet material in accordance with claim 1 which comprises the further step of:
   extracting 50 to 99 volume percent of polymer (2), with a solvent for polymer (2) which solvent does not dissolve polymer (1).

3. The method of producing a fibrous sheet material in accordance with claim 1 which comprises the further step of:
   heat-treating the fibrous sheet material produced by the method of claim 1 at a temperature which is higher than the stretching temperature of step (iii).

4. The method of producing a fibrous sheet material in accordance with claim 1 which comprises the further steps of:
   heat-treating the fibrous sheet material produced by the method of claim 1 at a temperature which is higher than the stretching temperature of step (iii), and then extracting 50 to 99 volume percent of polymer (2) with a solvent for polymer (2) which does not dissolve polymer (1).

5. A method of producing a fibrous sheet material which comprises:
   (i) extruding a molten mixture of 30 to 70 volume percent of polypropylene and 70 to 30 volume percent of the saponified product of ethylene/vinylacetate copolymer containing 30 to 45 mol percent of ethylene which is incompatible with said polypropylene and has a lower apparent melt viscosity than that of polypropylene under the extruding conditions, said copolymer satisfying the following formula wherein y is the percent of saponification and $x$ is the mole percent of ethylene:

$$0.533x+54.0 \leq y \leq 0.667x+63.0$$

to make a film consisting of said mixture, in which polypropylene forms the discontinuous phase and said copolymer forms the continuous phase in said film, and having its orientation in the lengthwise direction of the film;

(ii) laminating a plurality of sheets of said films in such an orientation that at least two sheets of said film are oriented at an angle of 60° to 120° with respect to each other; and then (iii) biaxially stretching said laminate 2 to 4 times in lengthwise and crosswise directions simultaneously at a temperature of from 120° to 150° C. to produce a fibrous sheet material consisting of said mixture and having both a discontinuous phase and a continuous phase.

6. The method of producing a fibrous sheet material in accordance with claim 5 which comprises the further step of:

heat-treating the fibrous sheet material produced by the method of claim 5 at a temperature of from 130° to 160° C.

7. The method of producing a fibrous sheet material in accordance with claim 5 which comprises the further step of:

extracting 50 to 99 volume percent of the saponified product of ethylene vinylacetate copolymer with a solvent for said copolymer which is not a solvent for polypropylene under conditions of extraction.

8. The method of producing a fibrous sheet material in accordance with claim 5 which comprises the further steps of:

heat-treating the fibrous sheet material produced by the method of claim 5 at a temperature of from 130° to 160° C.; and then extracting 50 to 99 volume percent of said copolymer with a solvent for said copolymer which is not a solvent for polypropylene under conditions of extraction.

9. A fibrous sheet material produced by the process which comprises:

(i) extruding a molten mixture of 30 to 70 volume percent of a crystalline polymer (1) and 70 to 30 volume percent of another polymer (2), which is incompatible with said crystalline polymer and has a lower apparent melt viscosity than the crystalline polymer under extrusion conditions, to make a film consisting of said mixture, in which the former polymer (1) forms the discontinuous phase and the latter polymer (2) forms the continuous phase in said film, and having its orientation in the lengthwise direction of the film;

(ii) laminating a plurality of sheets of said films in such an orientation that at least two sheets of said films are oriented at an angle of 60 to 120° with respect to each other; and then (iii) biaxially stretching said laminate 2 to 4 times in lengthwise and crosswise directions simultaneously at a predetermined temperature to produce a fibrous sheet material consisting of said mixture and having both a discontinuous and continuous phase.

10. The fibrous sheet material of claim 9 wherein said crystalline polymer is a member selected from the group consisting of polyethylene, polypropylene, polyamides and polyethylene terephthalate.

11. The fibrous sheet material of claim 9 wherein said polymer (2) is a member selected from the group consisting of ethylene copolymers, polystyrene, styrene copolymers, acrylates, polyamides and cellulose acetate.

12. The fibrous sheet material of claim 9 wherein the crystalline polymer is a polypropylene.

13. The fibrous sheet material of claim 9 wherein the polymer (2) is the saponified product of ethylene/vinylacetate copolymer containing 30 to 45 percent of ethylene.

14. The fibrous sheet material produced by extracting 50 to 99 volume percent of polymer (2) from the biaxially stretched laminate of claim 9 with a solvent for polymer (2) which solvent does not dissolve polymer (1).

15. The fibrous sheet material produced by subjecting the fibrous sheet material of claim 9 to the further step of heat-treating said fibrous sheet material at a temperature which is higher than the stretching temperature of step (iii) of claim 9.

16. The fibrous sheet material produced by subjecting the fibrous sheet material of claim 9 to the further steps of heat-treating said fibrous sheet material at a temperature which is higher than the stretching temperature of step (iii); and then extracting 50 to 99 volume percent of polymer (2) with a solvent for polymer (2) which does not dissolve polymer (1).

References Cited

UNITED STATES PATENTS

| | | | |
|---|---|---|---|
| 3,531,439 | 9/1970 | Fukushima et al. | 156—305 X |
| 3,131,113 | 4/1964 | Arbit et al. | 156—244 X |
| 3,255,065 | 6/1966 | Wyckoff | 156—229 |
| 3,384,531 | 5/1968 | Parrish | 156—229 X |
| 3,539,439 | 11/1970 | Calderwood et al. | 156—229 X |
| 3,567,539 | 3/1971 | Schirmer | 156—229 X |
| 3,092,891 | 6/1963 | Baratti | 28—82 |

RALPH S. KENDALL, Primary Examiner

C. WESTON, Assistant Examiner

U.S. Cl. X.R.

156—244; 161—151

PO-1050
(5/69)

UNITED STATES PATENT OFFICE
CERTIFICATE OF CORRECTION

Patent No. 3,701,701  Dated  October 31, 1972

Inventor(s) Hidenobu Sogi

It is certified that error appears in the above-identified patent and that said Letters Patent are hereby corrected as shown below:

Column 5, line 52, insert "two" after "the" and before "polymers"

Column 12, Table 8, in Ex. No. 72 under Elongation (percent) "5.7" should be - - 15.7 - -.

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents